(No Model.) 4 Sheets—Sheet 1.
F. M. ASHLEY.
CLOSED CONDUIT ELECTRIC RAILWAY.
No. 514,112. Patented Feb. 6, 1894.
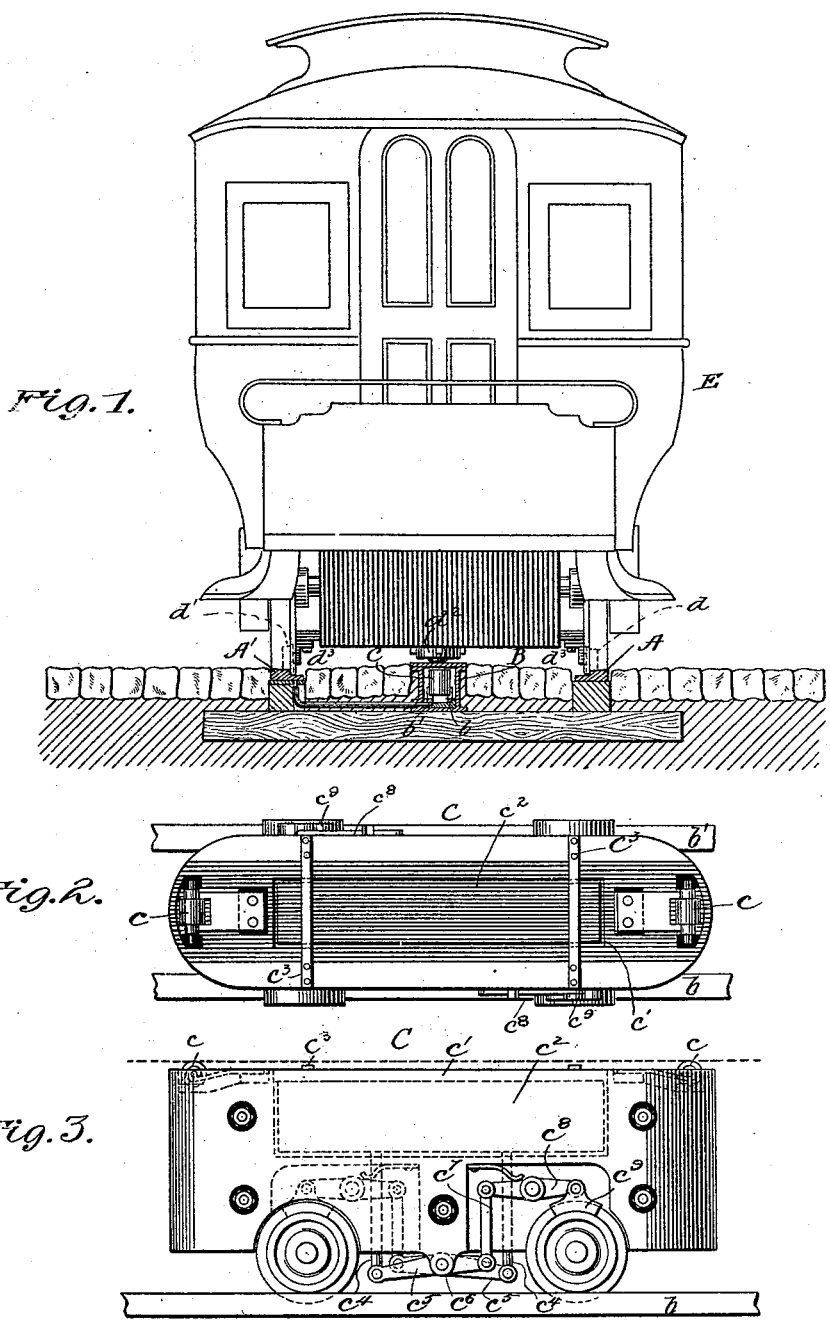

(No Model.) 4 Sheets—Sheet 2.
F. M. ASHLEY.
CLOSED CONDUIT ELECTRIC RAILWAY.
No. 514,112. Patented Feb. 6, 1894.
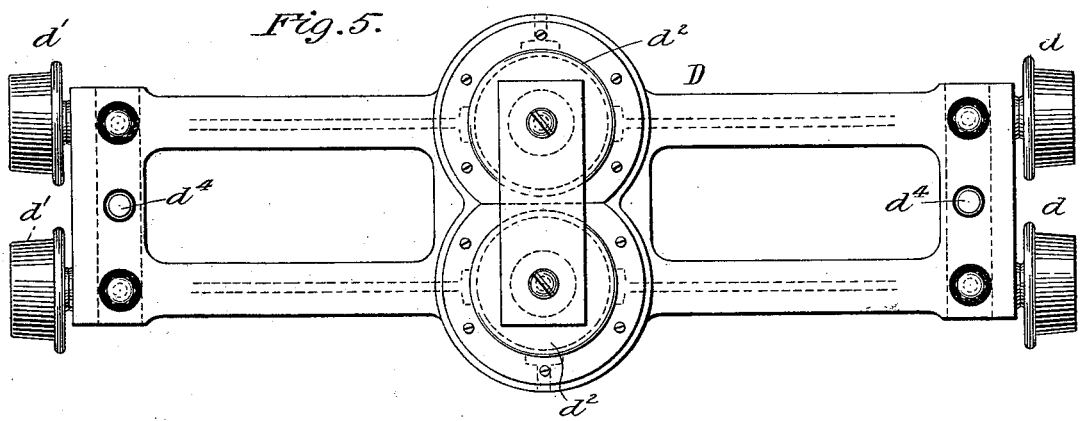
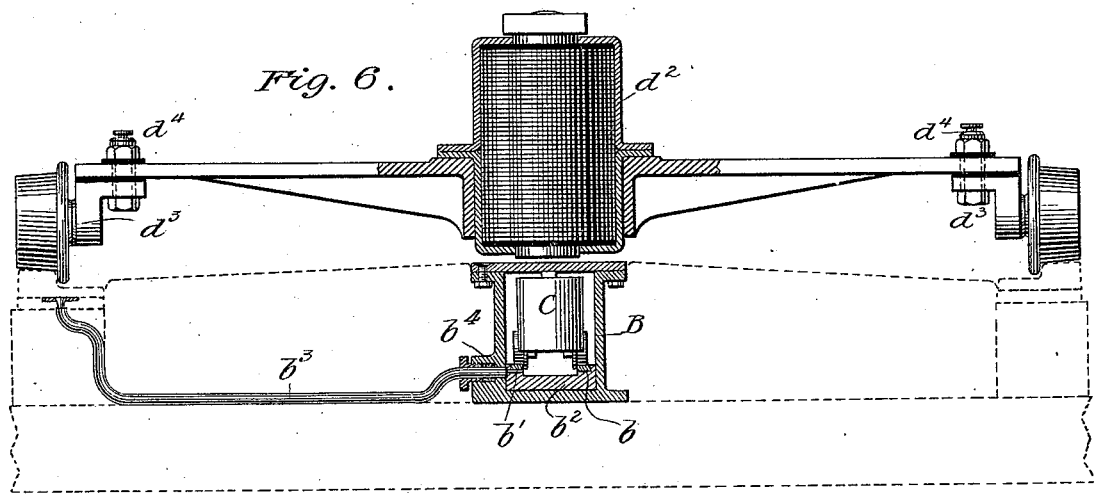
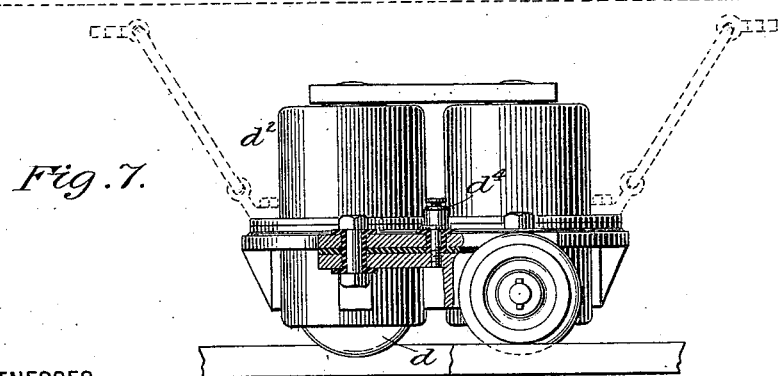
WITNESSES: INVENTOR
Frank L. Ober Frank M. Ashley
Jos. Juhl BY M. A. Rosenbaum
ATTORNEY (No Model.) 4 Sheets—Sheet 3.

F. M. ASHLEY.
CLOSED CONDUIT ELECTRIC RAILWAY.

No. 514,112. Patented Feb. 6, 1894.

WITNESSES:
Frank S. Ober
Jos. J. Uhl.

INVENTOR
Frank M. Ashley
BY
Wm. A. Rosenbaum
ATTORNEY

THE NATIONAL LITHOGRAPHING COMPANY,
WASHINGTON, D. C.

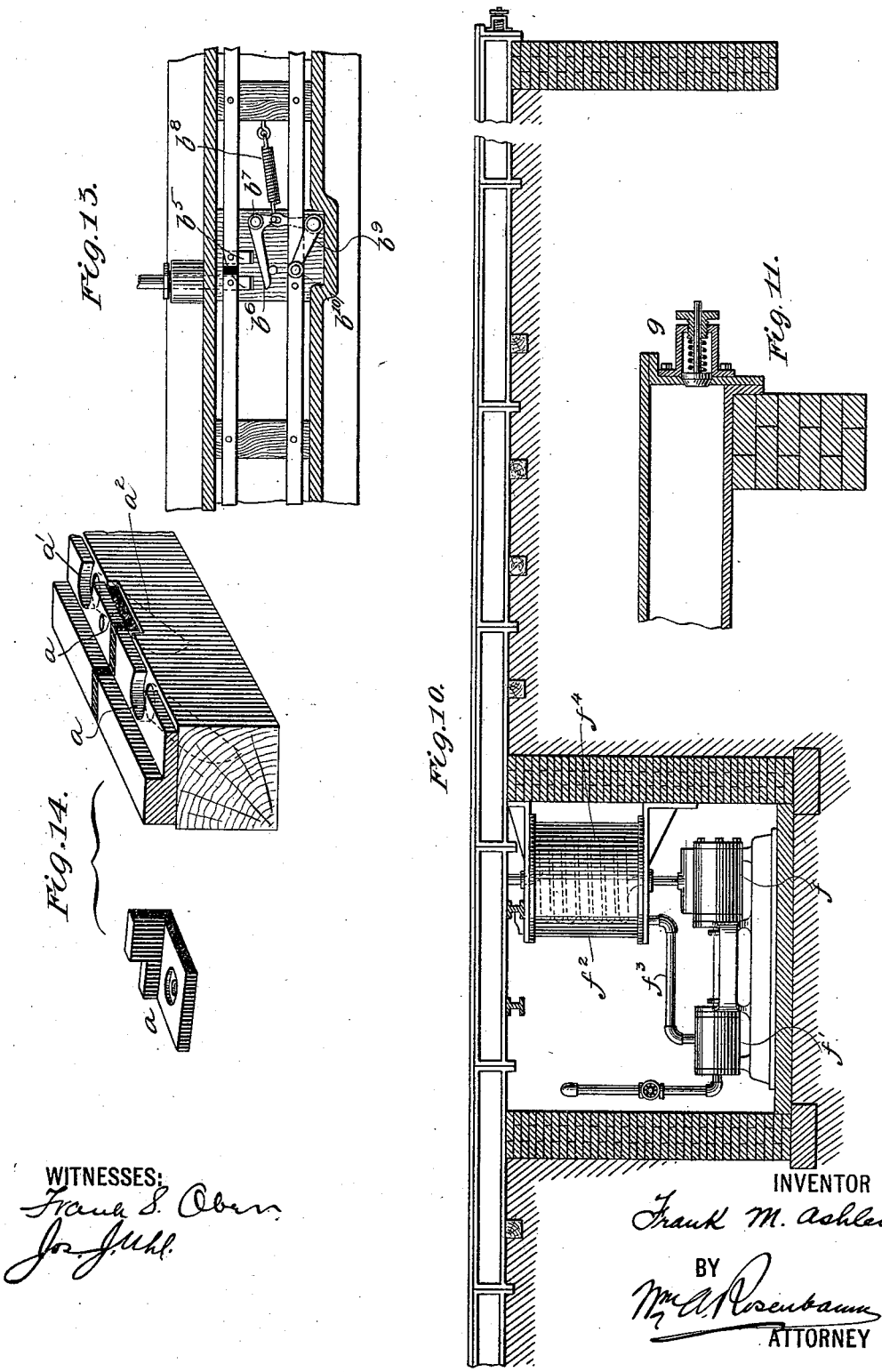

UNITED STATES PATENT OFFICE.

FRANK M. ASHLEY, OF HAWTHORNE, NEW JERSEY.

CLOSED-CONDUIT ELECTRIC RAILWAY.

SPECIFICATION forming part of Letters Patent No. 514,112, dated February 6, 1894.

Application filed December 23, 1892. Serial No. 456,136. (No model.)

*To all whom it may concern:*

Be it known that I, FRANK M. ASHLEY, a citizen of the United States, residing at Hawthorne, in the county of Passaic and State of New Jersey, have invented certain new and useful Improvements in Electric Railways, of which the following is a full, clear, and exact description.

My invention relates to electric railways, the object being to provide a successfully operating railway system in which a conduit or subway is utilized.

The invention consists of the construction hereinafter described and claimed.

Figure 9:
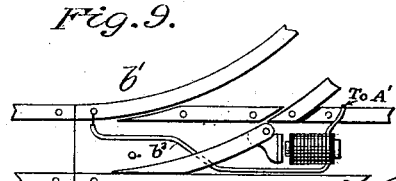
Figure 8:
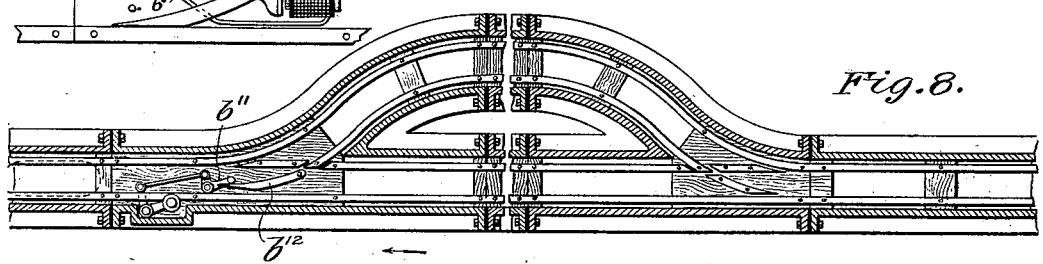
Figure 12:
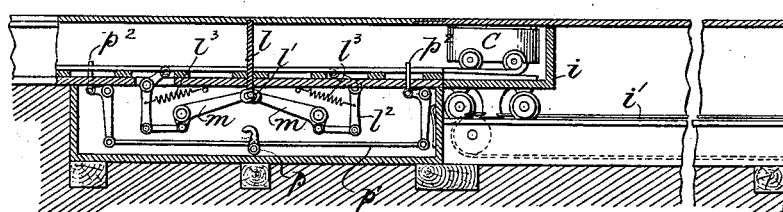
Figure 15:
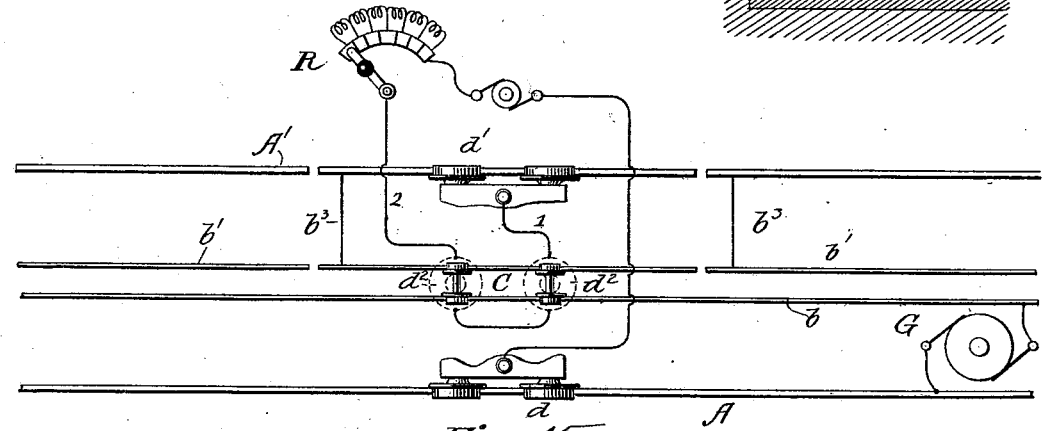

In the accompanying drawings, Figure 1 represents a cross-section of the roadbed and an elevation of the car. Figs. 2, 3 and 4, are, respectively, a plan, side elevation and bottom plan of what I shall hereinafter designate as the traveling switch. Figs. 5, 6 and 7 are, respectively, a plan, side elevation and end elevation of the trolley, Fig. 6 also illustrating an enlarged detail of the road-bed. Fig. 8 illustrates the track and switching apparatus for the traveling switch. Fig. 9 is a modification thereof. Fig. 10 illustrates the apparatus for supplying the conduit through which the traveling switch moves, with heated air. Fig. 11 is a detail thereof. Fig. 12 is a detail of the air lock and means whereby the traveling switch may be inspected. Fig. 13 is a detail of the circuit closer located in the conduit and operated temporarily and automatically by the traveling switch. Fig. 14 is a detail of the rail joint, and Fig. 15 is a diagram of the circuits.

Referring to the drawings by letters and numerals, A, A' represent the rails of the track; A is continuous and forms the return circuit, and A' is in sections insulated from each other in the manner shown in Fig. 14. This method of insulation consists of inserting a block $a$ of insulating material between the abutting ends of the rails. The block is L-shaped, the vertical portion standing between the rail ends and the horizontal portion resting under one of the rails and upon the string piece which supports the rails. It may be held in place by a bolt as shown. The adjoining ends of the rails are provided with openings $a'$ which communicate with passages $a^2$ shown in dotted lines, leading to a sewer, so that water which may collect on the rails and flow toward the joints will be conducted off, and short circuiting by moisture thus prevented.

Midway between the rails of the track is located an air and water tight conduit B. Shown in detail in Fig. 6. The top plate of this conduit, which may be of any suitable material, is flush with the surface of the street. Along the bottom of the conduit and in each corner are placed two rails $b, b'$ which extend throughout the conduit and are supported upon suitable blocks of insulating material $b^2$. The rail $b$ is continuous like the rail A, and the rail $b'$ is in sections, insulated from each other and corresponding to the sections of the rail A'. The sections of the rail $b'$ are electrically connected with the sections of the rail A' by branch conductors suitably insulated and extending under and through the road-bed. At the point where these sectional conductors enter the conduit, stuffing boxes $b^4$ are provided to effectually seal the opening. In this conduit the traveling switch C moves, as a complement to each car. This switch is shown in Figs. 2, 3 and 4. It has an iron body, built up, preferably, of iron plates and bolted together; its ends are rounded or they may be V-shaped if desired. The body is mounted upon axles which are provided with wheels running upon the rails $b$, $b'$, and as the wheels and axles are of electric conducting material the current is conveyed by the switch from one rail to the other as it travels along. The upper surface of the switch stands closely adjacent and parallel to the top plate of the conduit, but two rollers $c, c$, respectively, mounted at the ends of the switch in suitable spring bearings prevent the top of the switch from rubbing against the top plate of the conduit. The central and upper portion of the body of the switch is provided with a cavity $c'$ in which is placed a block of soft iron $c^2$ which has a slight vertical play therein. The upward movement of the block is limited by cross-pieces $c^3$. This block is provided with two downwardly projecting rods $c^4$ which respectively connect with levers $c^5$ pivoted intermediate of their extremities to lateral studs $c^6$. The opposite ends of these levers connect by means of links $c^7$ with other levers $c^8$, the latter being pivoted to the sides of the switch and carrying at their free ends brake-shoes $c^9$ which bear upon the upper sides of the switch. When the weight of the block $c^2$ is allowed to bear upon this system of levers the brakes are applied to the wheels.

As before stated the switch rail $b'$ is in sections, and the sections are insulated from each other as shown in Fig. 13. In order to overcome the possibility of sparking at these insulated joints when the switch passes over them I have provided an automatic circuit closer. The abutting ends of the rail $b$ are provided with contact plates $b^5$ which are bridged by an arm $b^6$ pivoted at $b^7$, and normally held out of contact with the plates by a spring $b^8$. A bell crank lever $b^9$ engages at one end with the lever $b^6$ in the manner shown and at the other end carries a roller $b^{10}$ which projects into the path of movement of the traveling switch. When the switch reaches a joint in the rails the rounded end strikes the roller and swings it outward thus closing the circuit between the adjacent sections of the sectional rail $b'$ before the wheels of the switch pass over the joint. When the switch has passed the joints the spring $b^8$ again opens the circuit between the sections. A similar arrangement is used to guide the traveling switch into a branch conduit or siding. This is shown in Fig. 8. The roller operated by the traveling switch acts through a second bell crank $b^{11}$, which in turn, throws the movable part of the rail $b^{12}$ and forces the traveling switch on to the branch track. A traveling switch moving in the opposite direction, indicated by the arrow on the main line, would open the switch when the flanges of its wheels strike the part $b^{12}$; but it would be immediately closed when the body of the switch struck the roller beyond, so that the normal position of the switch is closed. This arrangement is specially adapted for single track roads. In the modification shown in Fig. 9 the switch is closed by the electro-magnet which becomes energized as soon as the traveling switch touches the section $b'$ inasmuch as the branch $b^3$ connecting the particular section $b'$ at the switch, includes the electro magnet.

I next refer to the construction of the car or to the apparatus carried thereby for collecting the current. Somewhere beneath the car, preferably between its axles, is placed a small truck D which I shall call a trolley. This trolley carries four small wheels $d$, $d'$ two at each end, which run upon the regular tracks supporting the car E. The trolley is secured to the car body by chains or other flexible connections, so that its weight may rest wholly upon the track. At the center of the trolley frame there is supported in a suitable housing a two spool electro-magnet $d^2$ having its poles pointing downward and running as closely to the top plate of the conduit as practicable. The wheels of the trolley are mounted in brackets $d^3$ which are insulated from the main frame, but electrical connections are made therewith through binding posts $d^4$. The function of this trolley is to take the current from the sectional rail A', deliver it to the motor on the vehicle and thence carry it off to the return continuous rail A.

One of the difficulties encountered in conduit system electric railways where the electrical conductors are exposed, is leakage caused by moisture in the conduit. It will be observed that the conduit employed by me is a sealed one; there being no slot for a plow as is customary, but in order to further protect the conduit from moisture, and in case it should be impractical to make the conduit entirely impervious to water and air, I propose to maintain in the conduit a circulation of warm air which will keep it thoroughly dry. For this purpose I locate at the power station or any other suitable point along the roadway, a plant consisting of an air pump $f$, a steam engine $f'$ operating the same, a tank $f^2$ adapted to receive the exhaust steam from the engine through pipe $f^3$ and a coil of pipe $f^4$ located in said tank and communicating at one end with an outlet from the air pump and at the other end with the railway conduit, all as shown in Fig. 10. The air is forced through the coil by the pump is heated by the exhaust steam in the tank and then driven into and through the conduit.

The conduit is provided at any suitable point or points with pressure valves $g$ which allow the pressure to reach a certain amount, the excess escaping through the valves. The tendency of the pump is to exceed the normal pressure, so that a circulation is constantly maintained through the conduit.

At the end of the conduit or in the central station it is desirable to have means whereby the traveling switches used in the system may be examined and have any attention given them which is necessary. For this purpose at the extreme end of the conduit, as shown in Fig. 12, is a little car $i$ having a short length of track corresponding to the track $b$ $b'$, arranged on a slight incline. This car runs on tracks and is propelled by means of a cable $i'$ running over suitable guide pulleys and operated by a winch $i^2$ or in any other suitable manner. When a traveling switch has reached the end of the conduit it is run upon the car $i$ and drawn out to a convenient point where it may be examined. When the traveling switches are thus operated it is necessary to provide means for closing the conduit and prevent the escape of the warm air therein. For this purpose an automatically operated air lock is provided; this consists of a slide valve $l$ which closes the entire conduit and is movable vertically. Beneath and at the extreme end of the conduit is a chamber in which are located two bell cranks $m$ which are pivoted on the opposite sides of the valve $l$. One end of each is loosely connected to the valve, which is provided with a cross-bar $l'$ for that purpose, and the other ends are connected through links with other bell cranks $l^2$, which carry rollers standing in the path of movement of the traveling switches. Directly below the valve is a pivoted hook $p$ which is operated by a rod $p'$, a bell crank lever at each end and thrust rods $p^2$. Springs $l^3$ act upon the bell cranks as shown and tend to lift the valve. The operation of this air lock is as follows: When a traveling switch approaches from the left its first effective action is to strike and force downward the end of bell crank $l^2$. This opens the valve $l$ and carries the cross-bar $l'$ down into engagement with the hook $p$, the latter tilting backward to receive it. The valve is held in this position by the hook until the wheels of the moving switch strike the rod $p^2$ to the right and force it down, thus swinging the bell crank with which it is connected and releasing the hook $p$ from the cross-bar $l'$. The springs $l^3$ then act to close the valve. The same operation takes place when the switch returns.

The operation of the system is as follows: Generator G which is located at the central station supplies current to the continuous rail $b$ in the conduit. This current is transferred to the sectional conductor $b'$ by the traveling switch the current passing through its wheels and axles and from the sectional rail $b'$ the current is delivered through branches $b^3$ to the sectional rail A', thence taken by the trolley wheels $d'$ and wire 1, through the magnet $d^2$ on the car, thence by wire 2 to a controlling mechanism, such as a rheostat R, which may be used to control the motor on the car, thence through the motor and finally through the trolley wheels $d$ to the return rail A and the generator. This circuit may be run directly through the electro-magnet $d^2$, as described or this magnet may be connected in a branch circuit. It is preferred, however, to energize the magnet in some way from the main conductor. The iron body of the traveling switch, which accompanies each car and more especially the movable block of iron $c^2$ serves as the armature of the electro-magnet $d^2$, and as the car travels over the road the magnetic attraction between the magnet and this armature causes the switch to move in unison with the car. When the attraction of the magnet ceases, the motion of the switch is naturally retarded, but in order to prevent it being carried beyond the influence of the magnet by its inertia, I have provided the brakes hereinbefore described which are "set" immediately upon the release of the block $c^2$ by the electro-magnet and the car stops within a short distance, and is always ready to be picked up by the magnet. These brakes also prevent the switch from running away on a downgrade. As the switch moves along it successively transfers the current from one section of the rail $b'$ to the next without sparking, and as the conduit is closed and kept dry it would appear that this system can be operated without any considerable loss of energy due to leakage from the car. The only leakage which can take place is from the sectional rail A' and as only short lengths of this will be energized at one time this loss must be very small. It will be observed that in place of taking the current from the sectional rail A', I may, if I desire substitute for it a series of heads or blocks placed in the road-bed any distance apart less than the length of the car and equip the car with a shoe which shall drag over these heads and take the current therefrom. The shoe will be long enough to bridge from one head to the other and thereby prevent sparking. The heads will be connected with the sectional rail $b'$ by the branch conductors $b^3$ in the same manner as the sectional rail A'.

Having described my invention, I claim—

1. In a railway track, the combination of two abutting ends of rails, said ends being provided with openings $a'$ leading to a drain for the purpose set forth.

2. In a railway track, two rails having their abutting ends separated by a block of insulating material and being provided with openings $a'$ leading to a drain for the purpose set forth.

3. In a railway track, the combination of two abutting rails and an L-shaped block of non-conducting material separating the same, the vertical portion of the block separating the rails and the horizontal portion resting beneath one of the rails.

4. In an electric railway, the combination of a closed conduit, and a traveling switch moving in the same, the latter consisting of a body mounted upon wheels, an armature carried by but movable independent of the body, brake shoes bearing upon the wheels, and a system of levers connecting the armature with the brake shoes whereby a movement of the former will be imparted to the latter as described.

5. In an electric railway, a conduit containing a main and a sectional conductor, a stationary circuit closer adapted to electrically connect the sections of the sectional conductor, in combination with a traveling switch adapted to convey current from the main to the sectional conductor, and means whereby the traveling switch will automatically operate said circuit closer, substantially as described.

6. In an electric railway, a conduit containing a main and a sectional conductor, a circuit closer adapted to electrically connect the sections of the sectional conductor, a bell crank lever connected at one end with the circuit closer, in combination with a traveling switch adapted to convey the current from the main to the sectional conductor and engage with said bell crank to operate said circuit closer.

7. In an electric railway, a sealed conduit, a switching device moving in said conduit, means for maintaining a pressure of air in the conduit and an air lock at the end of the conduit through which the switching apparatus may pass.

8. In an electric railway, a sealed conduit, a switching device moving in said conduit, means for maintaining a pressure of air in the conduit and an air lock at the end of the conduit through which the switching apparatus may move, said air lock being automatically opened and closed by the switching apparatus, substantially as described.

9. In an electric railway, the combination of a closed conduit, a traveling switching apparatus moving therein, a railway track forming a portion of the working circuit and supplied with current through the said traveling switching apparatus, a car moving on said track a trolley carried by the car but running on the car track and an electro-magnet carried by the trolley and acting upon the traveling switching apparatus.

In testimony whereof I subscribe my signature in presence of two witnesses.

FRANK M. ASHLEY.

Witnesses:
 Jos. J. Uhl,
 Mrs. F. M. Ashley.